Patented Dec. 8, 1942

2,304,080

UNITED STATES PATENT OFFICE 2,304,080

PREPARATION OF ALPHA TRIOXY-METHYLENE

Charles Edward Frank, Wilmington, Del., assignor to E. I. du Pont de Nemours & Company, Wilmington, Del., a corporation of Delaware No Drawing. Application January 11, 1940, Serial No. 313,467

7 Claims. Cl. (260—340)

This invention relates to the preparation of symmetrical trioxane, the cyclic formaldehyde trimer known also as alpha-trioxymethylene, and more particularly to the process for preparing s-trioxane from formaldehyde.

This invention has as an object the provision of an improved method of preparing s-trioxane from formaldehyde. Another object is to obtain s-trioxane in high yields by a process which is simple to operate on any scale. Other objects will appear hereinafter.

These objects are accomplished by the following invention wherein an aqueous formaldehyde solution and preferably an aqueous formaldehyde solution having 50–70% formaldehyde concentration (and initially substantially free from trioxane) and containing a strong acidic catalyst equivalent to a 0.1 to 4% concentration of sulfuric acid by weight is distilled and the s-trioxane separated from the distillate.

In a further preferred modification of the invention, an aqueous formaldehyde solution containing preferably 60% formaldehyde and 2% sulfuric acid by weight, is slowly distilled, usually with partial reflux. The distillate consists of s-trioxane and aqueous formaldehyde solution, and the s-trioxane is isolated by extraction in a continuous or batch process, with a water-immiscible solvent. Subsequent to the removal of the trioxane, the distillate is returned to the reaction vessel being preferably fortified with formaldehyde approximately equivalent to the trioxane extracted. By repeatedly recycling the distillate in the above manner, a continuous process giving high yields of trioxane is realized.

Trioxane is a white crystalline solid melting at 63–64° and boiling at 114.5° C. It is exceedingly soluble in methylene chloride, chloroform, and acetone, readily soluble in benzene, alcohol, ether, and carbon tetrachloride, somewhat more difficultly soluble in petroleum ether. At room temperature trioxane dissolves in water to the extent of about 20%.

The more detailed practice of the invention is illustrated by the following examples, wherein parts given are by weight. There are of course many forms of the invention other than these specific embodiments.

EXAMPLE I

To a reaction vessel containing 920 parts of water and 45 parts of concentrated sulfuric acid is added 1580 parts of paraformaldehyde (approximately 1500 parts of formaldehyde on a dry basis) to make a mixture containing about 60% of formaldehyde. A vertical condenser-jacketed unpacked column is attached to the reaction vessel. A tube extending from the top of the column leads to the receiver, which is cooled to about 0° C. The system opens to the atmosphere through a second tube in the receiver. The mixture is heated under a reflux until the paraformaldehyde has dissolved. The condenser jacket is then emptied and the solution slowly distilled, about 5% of the original volume being distilled each hour.

The distillate contains approximately 20% s-trioxane, 30% formaldehyde, and 50% water. This is extracted with three-fourths its volume of methylene chloride divided into three portions. Washing with aqueous ammonia removes traces of formaldehyde from the extract. Usually 50–60 parts of 28% ammonia is required to remove the formaldehyde from the methylene chloride extract of about 1500 parts of distillate.

After drying over calcium chloride, the trioxane solution is filtered, cooled to about −80° C., and the crystallized product removed by filtration. The trioxane obtained during 12 hours by this process amounts to 275–300 parts, representing an 18–20% conversion of formaldehyde to trioxane.

After such a 12-hour period, the extracted distillate, together with additional paraformaldehyde equivalent to the trioxane formed, is returned to the reaction vessel, and the whole procedure repeated. In this manner an essentially continuous process is carried out through a 60-hour distillation period, involving five cycles. A total of 2400 parts of formaldehyde thus yields 1337 parts of trioxane, a conversion of 55.6%. Since 600 parts of formaldehyde is recovered, this is equivalent to a 74.3% yield based on formaldehyde consumed.

The product obtained by this procedure is essentially pure, although it may contain a small amount of hexamethylenetetramine. If desired, the material may be further purified by redissolving in methylene chloride, washing with water, and recrystallizing, whereupon 80% of the pure product is recovered.

Tables I and II summarize the results thus obtained. In Table I the successive 12-hour periods in the 60-hour run are listed. After the first period, yields of trioxane are actually higher than indicated, since no allowance is made for mechanical losses of formaldehyde.

TABLE I

*Preparation of trioxane*

[Summary of 5 successive 12-hour periods in a 60-hour run.]

| | | | | | |
|---|---|---|---|---|---|
| Parts of solution at start of distillation | 2,540 | 2,600 | 2,735 | 2,640 | 2,255 |
| Formaldehyde in solution at start of distillation: | | | | | |
| Parts | 1,500 | 1,545 | 1,660 | 1,615 | 1,295 |
| Percent | 59 | 59 | 61 | 61 | 57 |
| Parts of formaldehyde added before distillation | | 250 | 350 | 300 | |
| Solution distilled in 12 hours: | | | | | |
| Parts | 825 | 1,149 | 1,738 | 1,623 | 1,474 |
| Percent | 32 | 44 | 64 | 62 | 66 |
| Trioxane in distillate: | | | | | |
| Parts | 205 | 233 | 346 | 321 | 232 |
| Percent | 24.8 | 20.2 | 19.9 | 19.8 | 15.7 |
| Conversion of formaldehyde to trioxane percent | 14 | 15 | 21 | 20 | 18 |

TABLE II

*Preparation of trioxane*

[Summary of 60-hour run]

| Time in hours | Total parts of formaldehyde employed | Trioxane obtained | |
|---|---|---|---|
| | | Parts | Percent of theory |
| 12 | 1,500 | 205 | 13.7 |
| 24 | 1,750 | 438 | 25.0 |
| 36 | 2,100 | 784 | 37.3 |
| 48 | 2,400 | 1,105 | 46.1 |
| 60 | 2,400 | 1,337 (74.3% yield) | 55.6 |

EXAMPLE II

Paraformaldehyde (1000 parts) is dissolved by heating in a solution of 28 parts of concentrated sulfuric acid and 500 parts of water. Distillation under a pressure of 1.75 atmospheres yields a solution containing approximately 12% of trioxane, the remaining distillate being an aqueous formaldehyde solution. The distillate from the first six hours is extracted with methylene chloride, and the extract washed with a little aqueous ammonia to remove traces of formaldehyde. Paraformaldehyde equivalent to the trioxane formed is added to the extracted distillate and this mixture returned to the reaction vessel for recycling. The product is isolated as described under Example I.

A total of 1200 parts of formaldehyde in an 11-hour distillation consisting of two cycles yields 304 parts of trioxane, a conversion of 25.3%. The effect of superatmospheric pressure upon this process for preparing trioxane is illustrated by Table III, wherein the results of Examples I and II are listed for comparison. It is apparent that the increase in pressure effects an increase in the rate of trioxane formation.

TABLE III

*Effect of pressure on preparation of trioxane*

| | Pressure, 1.0 | Atmospheres 1.75 |
|---|---|---|
| Reaction time hours | 60 | 11 |
| Weight of reaction mixture parts | 2500 | 1500 |
| Weight of trioxane obtained do | 1337 | 304 |
| Trioxane in distillate percent | 19.6 | 11–12 |
| Reaction solution distilled per hour do | 4.5 | 16.6 |
| Trioxane obtained per hour parts | 22.9 | 27.6 |
| Trioxane obtained per hour per 1000 parts of reaction solution parts | 9.2 | 18.4 |

EXAMPLE III

Methanol-free aqueous formaldehyde solution (4400 parts containing about 37% formaldehyde) is concentrated to 2800 parts by distillation at 35 mm. pressure. To this approximately 55% formaldehyde solution are added 30 parts of 38% hydrochloric acid and 50 parts of calcium chloride. The solution is distilled from a vessel fitted with a column leading to a receiver cooled to 0° C. The distillate from the first 12 hours yields about 60 parts of trioxane, after extraction and crystallization as outlined in preceding examples. The extracted distillate (aqueous formaldehyde) is then returned to the reaction flask for recycling.

The above process is repeated four times, each time the distillation period occupying about 14 hours. At the end of each 14 hour period trioxane is extracted from the distillate, and the extracted distillate is returned to the reaction vessel without supplying any additional formaldehyde at any time.

In carrying out the distillation in this manner, the formaldehyde content of the reaction solution decreases from 55 to approximately 25%. After bringing the reaction to the proper temperature and distilling rate during which 60 parts of trioxane distilled, the trioxane obtained during successive equivalent time periods (14 hours each) amounts to 214, 151, 129, and 109 parts. At the conclusion of this run trioxane is still being evolved, but more slowly. It is thus apparent that trioxane may be obtained from aqueous formaldehyde solution of almost any concentration, but best from the more concentrated solutions.

EXAMPLE IV

A solution of 18 parts of concentrated sulfuric acid in 25 parts of water is added to 2000 parts of a pasty mixture of aqueous formaldehyde solution and paraformaldehyde (70% formaldehyde). This mixture is placed in a vessel fitted with a column leading to a receiver cooled to 0° C. The mixture is heated with stirring and slowly distilled. The distillate of 13 hours (728 parts) contains 183 parts of trioxane.

EXAMPLE V

Boron trifluoride catalyst (30 parts of $BF_3.3-H_2O$) is added to 1000 parts of 60% formaldehyde solution. The solution is placed in a vessel fitted with a column leading to a receiver cooled at 0° C. Six hours of distillation yields 827 parts of distillate; 111 parts of trioxane is obtained from this distillate by extraction and crystallization in the manner outlined above.

This process is applicable to aqueous formaldehyde solutions of a wide variation in concentration, although it would not ordinarily be operated outside the range of 25 to 70% formaldehyde. In the lower ranges reaction is slow and excessive amounts of water distill with the product; at higher concentrations removal of water from the reaction mixture during distillation tends to quickly transform much of the formaldehyde to the insoluble formaldehyde polymer. Concentrations outside the range 50–70% require higher temperature equipment. Formaldehyde concentrations of 50–70% may be effectively employed; using ordinary equipment. In this range little difficulty is encountered in maintaining a clear solution, and the distillation proceeds smoothly with good evolution of trioxane. The preferred formaldehyde concentration is 60–65%; in composition this solution closely approximates methylene glycol. At this concentration the reaction goes most smoothly and trioxane is steadily evolved at a comparatively rapid rate.

Solutions of suitable formaldehyde concentration may be prepared by dissolving formaldehyde or any of the polymethylene glycols or polyoxymethylenes in water, by concentrating more dilute formaldehyde solutions, by passing gaseous formaldehyde into water until the desired concentration has been obtained, or by combinations of these processes, or by other processes known to the art.

Acidic catayslts in concentrations equivalent to 0.1–4% of $H_2SO_4$ by weight are valuable in bringing about this trimerization of formaldehyde. At lower concentrations of cataylst, the rate of reaction is so slow as to make the process impracticable. At higher concentrations of catalyst, competitive side reactions become appreciable; for example, at acid concentrations of 10% or more by weight these side reactions, particularly the auto-oxidation reduction of formaldehyde to form methyl formate, methylal, and other products, largely overshadow the formation of trioxane.

Sulfuric acid in a concentration of about 2% by weight was found to have most general utility. However, a wide variety of acidic substances may be employed, in general, any acid material having a dissociation constant greater than $1 \times 10^{-3}$. These include acids such as hydrochloric, hydrofluoric, hydrobromic, phosphoric, benzenesulfonic, toluenesulfonic, oxalic, monochloracetic, and trichloracetic. In addition, acidic salts and acid-producing substances such as boron trifluoride, thionyl chloride, sulfuryl chloride, phosphorus chloride and oxychloride and sodium bisulfate, and, in general, strong acid catalysts, i. e., those having an acidic dissociation constant of at least $1 \times 10^{-3}$ are effective.

An important modification of this process is the recycling of the water and formaldehyde of the distillate subsequent to the removal of the trioxane, either at intervals or in a continuous process. This is carried out most effectively by returning with this solution an amount of formaldehyde equivalent to the trioxane removed. Gaseous or polymeric formaldehyde or concentrated formaldehyde solutions may be added to the extracted solution or to the reaction mixture simultaneously with this solution. A constant formaldehyde concentration and constant volume level in the reaction vessel may be obtained if continuous extraction is employed in the receiving vessel, and a constant stream of extracted distillate from this receiver is returned to the reaction vessel along with a properly adjusted flow of formaldehyde gas, polymer, or solution.

If desired, the extracted aqueous distillate may be used in other applications requiring a formaldehyde solution. This may be desirable if the process is run in connection with a formaldehyde plant capable of utilizing dilute solutions advantageously. By so doing, small amounts of by-products which may be formed in side reactions are prevented from accumulating. If the distillate is thus utilized a constant amount of concentrated formaldehyde solution may be run into the reaction vessel continuously.

The process may be carried out at atmospheric or superatmospheric pressures. Although the process is satisfactory under atmospheric pressure conditions, the application of pressures of up to 4 atmospheres is sometimes useful. Under these conditions, the temperature can be raised and the rate of trioxane formation during the distillation is increased.

As outlined in the above examples, trioxane can be isolated from the reaction mixture by extracting with methylene chloride, ether, or any of a variety of suitable organic solvents. Any solvent for the trioxane which is substantially insoluble in water may be employed. The trioxane is isolated from the extraction solvent by crystallization or by distillation and this product is sufficiently pure for most purposes. However, where pure trioxane is desired, the trioxane solution is first washed with an aqueous solution of ammonia, sodium bisulfite, or some other suitable reagent in order to remove traces of formaldehyde, and subsequently dried and purified as before. The process is also applicable to a continuous process wherein the formaldehyde distills, is caught in a separatory receiver containing the extracting solvent which continuously separates the trioxane and water solutions, returns the latter to the reaction vessel and the former to a still to separate the trioxane from the solvent which is distilled back to the separatory receiver.

Where found more convenient, fractional distillation may be employed to separate trioxane from the aqueous formaldehyde solution which distills concurrently during the process. On the other hand, trioxane may be separated directly from the vapors distilling from the reaction vessel by an inverse fractionation procedure whereby the aqueous formaldehyde is returned to the reaction flask and the crude trioxane is obtained directly in the receiving vessel.

The success of the present process for preparing trioxane is dependent upon obtaining the acidic conditions must favorable for its formation. With too high an acid concentration, trioxane is not formed and the formaldehyde undergoes other reactions, particularly a disproportionation yielding methyl formate and other products. Unless there is present at least 0.1% of an acid catalyst, no reaction occurs, or at best it is very slow.

This invention affords a simple and economical method whereby symmetrical trioxane may be obtained in good yields by the controlled trimerization of formaldehyde in aqueous solution. By this process trioxane may be prepared on a commercial scale both easily and cheaply which heretofore has never been possible.

Trioxane is of value as a source of formaldehyde in chemical reactions and in the manufacture of plastics, textile chemicals and other materials of commercial importance and is of further value as a special solvent having a variety of applications.

The above description and examples are intended to be illustrative only. Any modification of or variation therefrom which conforms to the spirit of the invention is intended to be included within the scope of the claims.

What is claimed is:

1. Process which comprises distilling an aqueous formaldehyde solution containing initially substantially no trioxane and having a hydrogen ion concentration corresponding to that caused by the presence of 0.1 to 4.0%, by weight, of sulfuric acid and separating the trioxane from the distillate.

2. Process which comprises distilling an aqueous formaldehyde solution containing 50–70% of formaldehyde and initially substantially no trioxane and having a hydrogen ion concentration corresponding to that caused by the presence of 0.1 to 4.0%, by weight, of sulfuric acid and separating the trioxane from the distillate.

3. Process which comprises distilling an aqueous formaldehyde solution containing 50–70% of formaldehyde and initially substantially no trioxane and having a hydrogen ion concentration corresponding to that caused by the presence of 0.1 to 4.0%, by weight, of sulfuric acid and separating the trioxane from the distillate by extraction therefrom by means of a solvent immiscible with water.

4. Process which comprises distilling an aqueous formaldehyde solution containing 50–70% of formaldehyde and initially substantially no trioxane and having a hydrogen ion concentration corresponding to that caused by the presence of 0.1 to 4.0%, by weight, of sulfuric acid and separating the trioxane from the distillate by extraction therefrom by means of a solvent immiscible with water, the extracted aqueous distillate and additional formaldehyde being added to the reaction vessel to bring the formaldehyde concentration therein to 50–70%.

5. Process of claim 2 wherein the hydrogen ion concentration corresponds to that obtained by the use of 2%, by weight, of sulfuric acid and the formaldehyde concentration is 60–65%.

6. Process of claim 2 wherein the hydrogen ion concentration corresponds to that obtained by the use of 2%, by weight, of sulfuric acid, the formaldehyde concentration is 60–65%, and the distillation is conducted at a pressure substantially above atmospheric pressure and at such a rate that approximately 5 to 25% of the original volume of solution is removed per hour.

7. Process of claim 3 wherein, in the distillate, the formaldehyde and water are separated from s-trioxane by distillation.

CHARLES EDWARD FRANK.